(12) United States Patent
Rikiishi

(10) Patent No.: US 9,781,376 B2
(45) Date of Patent: Oct. 3, 2017

(54) TELEVISION RECEIVER AND VIDEO DISPLAY DEVICE

(71) Applicant: Kabushiki Kaisha Toshiba, Tokyo (JP)

(72) Inventor: Kazuyuki Rikiishi, Ome (JP)

(73) Assignees: Kabushiki Kaisha Toshiba, Tokyo (JP); Toshiba Visual Solutions Corporation, Aomori (JP)

( * ) Notice: Subject to any disclaimer, the term of this patent is extended or adjusted under 35 U.S.C. 154(b) by 287 days.

(21) Appl. No.: 14/184,175

(22) Filed: Feb. 19, 2014

(65) Prior Publication Data

US 2014/0184931 A1    Jul. 3, 2014

Related U.S. Application Data

(63) Continuation of application No. PCT/JP2013/058652, filed on Mar. 25, 2013.

(30) Foreign Application Priority Data

Dec. 28, 2012    (JP) .................................. 2012-288954

(51) Int. Cl.
  *H04N 5/64*    (2006.01)
  *G02F 1/1333*    (2006.01)

(52) U.S. Cl.
  CPC ..... *H04N 5/64* (2013.01); *G02F 2001/13332* (2013.01); *G02F 2001/133328* (2013.01)

(58) Field of Classification Search
  CPC ........................................... G02F 2001/133328
  (Continued)

(56) References Cited

U.S. PATENT DOCUMENTS

| 7,349,040 B2 | 3/2008 | Lee et al. |
| 2006/0018106 A1 | 1/2006 | Shoji et al. |

(Continued)

FOREIGN PATENT DOCUMENTS

| JP | 2000-314872 | 11/2000 |
| JP | 2006-53528 | 2/2006 |

(Continued)

OTHER PUBLICATIONS

International Search Report from corresponding PCT/JP2013/058652 application mailed Mar. 25, 2013.

*Primary Examiner* — Jared Walker
(74) *Attorney, Agent, or Firm* — Rutan & Tucker, LLP

(57) ABSTRACT

According to one embodiment, television receiver includes display and housing. The display includes screen, first and second ends, and first corner. First end extends along first direction. Second end extends along second direction. The housing includes first and second members, and opening. The first member includes first and second walls. First wall covers the first end from front of the screen. Second wall extends from circumference of the first wall towards back of the screen and covers the first end. The second member includes third and fourth walls. Third wall covers the second end from the front. Fourth wall extends from circumference of the third wall towards the back and covers the second end. Part at which the first and the second members are abutted is configured straight and intersects the first and second directions between second corner and position away from third corner in direction along first/second direction.

7 Claims, 8 Drawing Sheets

(58) Field of Classification Search
USPC .................................................. 348/836, 843
See application file for complete search history.

(56) References Cited

U.S. PATENT DOCUMENTS

| | | | |
|---|---|---|---|
| 2012/0033143 A1* | 2/2012 | Nonaka | H04N 5/64 |
| | | | 348/843 |
| 2012/0162875 A1 | 6/2012 | Shimomichi | |
| 2012/0314152 A1* | 12/2012 | Zhao | H05K 5/02 |
| | | | 349/58 |

FOREIGN PATENT DOCUMENTS

| | | |
|---|---|---|
| JP | 2007-136192 | 6/2007 |
| JP | 2008-80044 | 4/2008 |
| JP | 3158354 | 3/2010 |
| JP | 3161675 | 7/2010 |
| JP | 2012-138842 | 7/2012 |

* cited by examiner

TELEVISION RECEIVER AND VIDEO DISPLAY DEVICE

CROSS-REFERENCE TO RELATED APPLICATIONS

This application is a continuation of PCT international application Ser. No. PCT/JP2013/058652, filed Mar. 25, 2013, which designates the United States, incorporated herein by reference, and which is based upon and claims the benefit of priority from Japanese Patent Application No. 2012-288954, filed Dec. 28, 2012, the entire contents of which are incorporated herein by reference.

FIELD

Embodiments described herein relate generally to a television receiver and a video display device.

BACKGROUND

Conventionally, there has been known a television receiver in which a frame-like part of a housing thereof covers a circumferential edge of a display device.

With this type of television receiver, it is desirable that the configuration at a boundary part of a plurality of members configuring the housing be less inconvenient such as being not likely to mar the appearance thereof, as one example.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
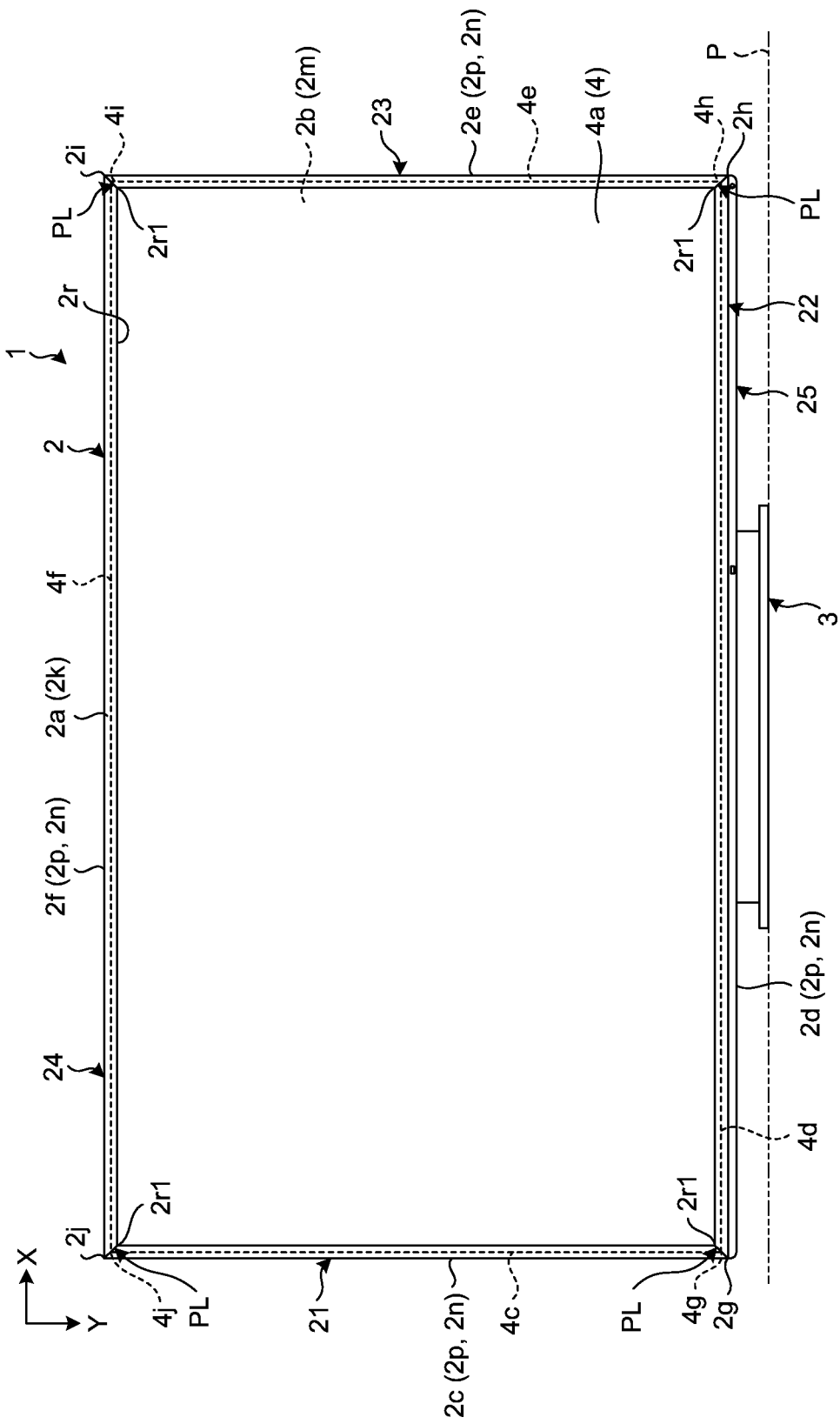
FIG. 1 is an exemplary front view of one example of a television receiver according to an embodiment.
Figure 2:
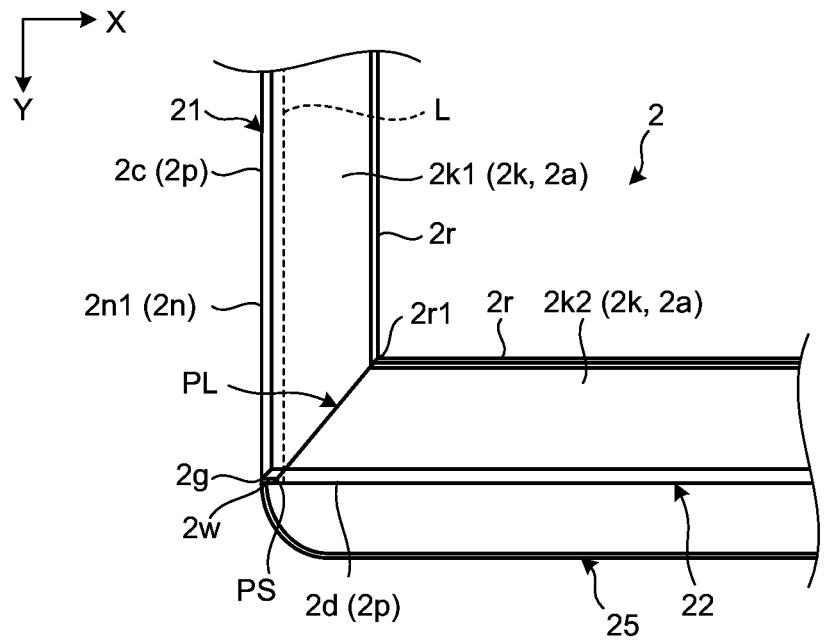
FIG. 2 is an exemplary front view of a portion of one example of the television receiver in the embodiment.

In general, according to one embodiment, a television receiver comprises a display device and a housing. The display device comprises a display screen, a first end, a first corner, and a second end. The first end is positioned on a circumferential edge side of the display screen and extending along a first direction when the display screen is viewed from the front thereof. The first corner is adjacent to the first end and positioned on the circumferential edge side of the display screen. The second end is adjacent to the first corner, positioned on the circumferential edge side of the display screen, and extending along a second direction intersecting the first direction when the display screen is viewed from the front thereof. The display device is in a quadrangular shape when the display screen is viewed from the front thereof. The housing comprises a first member, a second member, and an opening. The first member comprises a first wall and a second wall. The first wall covers the first end from a front side of the display screen along the first end. The second wall extends from a circumferential edge side of the first wall towards a back side of the display screen and covering the first end. The second member comprises a third wall and a fourth wall. The third wall covers the second end from the front side of the display screen along the second end. The fourth wall extends from a circumferential edge side of the third wall towards the back side of the display screen and covering the second end. The display screen is exposed through the opening. A part at which the first member and the second member are abutted is configured in a straight line intersecting the first direction and the second direction between a second corner of the opening and a position away from a third corner of the first member or the second member on a circumferential edge side in a direction along the first direction or the second direction when the display screen is viewed from the front thereof.

Following exemplary embodiments and modifications thereof comprise the same or similar configurations. In the following description, the same or similar configurations are given with common reference numerals or signs, and redundant explanations are omitted. In the respective drawings, directions are indicated for convenience. An X direction is the long direction of a display device, a Y direction is the short direction of the display device, and a Z direction is the thickness direction of the display device. The X direction, the Y direction, and the Z direction intersect with (are orthogonal to) one another. In the embodiment, the X direction is an example of a second direction, and the Y direction is an example of a first direction.

A television receiver 1 (video display device) that is an example of an electronic device according to the embodiment comprises, as illustrated in FIG. 1, a housing 2 and a support 3 (support, pedestal, or stand). The support 3 is placed on a placing portion (placement surface P) such as a pedestal, a desk, and a shelf, and supports the housing 2. Furthermore, the support 3 can support the housing 2 to be rotatable (movable, displaceable, or slidable). Examples of the rotation mode include swiveling, pivoting, and tilting.

In the embodiment, as illustrated in FIG. 1 as one example, the housing 2 is configured in a quadrate shape (rectangular shape or quadrangular shape) when the face 4a is viewed from the front thereof (hereinafter, described simply as a frontal view, i.e., line of sight in FIG. 1). The housing 2 is constructed in a rectangular parallelepiped shape to be thin and flat in the front-back direction thereof (thickness direction of a display device 4). The housing 2 comprises a face 2a (front face, anterior face, or surface) and a face 2b (back face, posterior surface, or reverse face) opposite the face 2a. The face 2a and the face 2b are roughly in parallel with each other. The housing 2 comprises four ends 2c to 2f (sides or edges) and four corners 2g to 2j (protruding portions, rounded portions, or ends) in the frontal view (and in a back view). The ends 2c and 2e are examples of the shorter sides. The ends 2d and 2f are examples of the longer sides. Furthermore, in the embodiment, the corner 2g is an example of a third corner.

The housing 2 further comprises a wall 2k (anterior wall portion or front wall portion) and a wall 2m (posterior wall or rear wall) as one example. The wall 2k comprises the face 2a. The wall 2m comprises the face 2b. The wall 2k is in a quadrangular, frame-like, and plate-like shape (in the embodiment, a rectangular, frame-like, and plate-like shape as one example). Furthermore, the wall 2m is in a quadrangular plate-like shape (in the embodiment, a rectangular plate-like shape as one example). The housing 2 further comprises four walls 2n (side walls, end walls, standing walls, or extending portions) as one example. The walls 2n comprise faces 2p (side faces, or circumferential faces) extending between the wall 2k and the wall 2m. The wall 2k further comprises an opening 2r in a quadrate shape as one example. The housing 2 can be composed of synthetic resin or metallic material, for example. In the embodiment, a corner 2r1 of the opening 2r is an example of a second corner.

The housing 2 houses therein at least a portion of the display device 4 (display module, display, or panel). In the embodiment, the face 4a (display screen) of the display device 4 positioned on the face 2a side is exposed to the front (outside) of the housing 2 through the opening 2r as one example, and a user can view the face 4a through the opening 2r from the front side. Images (videos) are displayed on the face 4a. In the embodiment, the display device 4 is configured in a quadrangular shape (in the embodiment, a rectangular shape as one example) in the frontal view. The display device 4 is further configured in a rectangular parallelepiped shape to be thin and flat in the front-back direction. The display device 4 comprises four ends 4c to 4f and four corners 4g to 4j. In the embodiment, the end 4c is an example of a first end, the end 4d is an example of a second end, and the corner 4g is an example of a first corner.

Furthermore, the display device 4 is, for example, a liquid crystal display (LCD) and an organic electro-luminescent display (OELD). On the front face side of the display device 4, a transparent touch panel (input panel, input sheet, or input device, not depicted), a cover, and others in a thin plate-like or sheet shape covering the face 4a may be provided. The touch panel may be provided on the display device 4 as what is called an in-cell touch panel.

Furthermore, in the embodiment, on the posterior side (rear side, back side, wall 2m side, or side opposite the face 4a) of the display device 4 inside the housing 2, a circuit board (substrate, control board, main board, or printed-circuit board, not illustrated) is housed, as one example. The board is provided in parallel with a face opposite (reverse face, not illustrated) the face 4a of the display device 4. Moreover, the board is provided in a state of being spaced apart from the walls 2k, 2m, 2n, and others, more specifically, in a state that space is formed with the walls 2k, 2m, 2n, and others. Furthermore, the board is fixed to the display device 4 or to the housing 2 with coupling tools, for example, screws (not illustrated).

On the board, mounted are a plurality of components (electric components, electronic components, or elements, not illustrated), other than connectors, such as a central processing unit (CPU). Examples of the components include heat generators. To deal with the components of a large heat generation amount (heat generators), a cooling mechanism (heat receiver, heat transfer portion, heat dissipation portion, or fan, not illustrated) can be provided. The circuit board and components configure at least a portion of a control circuit (not illustrated). The control circuit can comprise, for example, a video-signal processing circuit, a tuner, a High-Definition Multimedia Interface (HDMI) signal processor, an audio and video (A/V) input terminal, a remote-control signal receiver, a controller, a selector, an on-screen display interface, a storage module (for example, a read only memory (ROM), a random access memory (RAM), and a hard disk drive (HDD)), and an audio-signal processing circuit. The control circuit controls such operations as the output of videos (such as movies and still pictures) on the face 4a of the display device 4, the output of audio from a speaker (not illustrated), and light emission of a light emitting diode (LED, not depicted). The display device 4, the speaker, and the LED are examples of output modules.

In the embodiment, as illustrated in FIGS. 1 to 4 as one example, the housing 2 is configured with a plurality of members 21 to 26 (components or segmented bodies) in combination. More specifically, the housing 2 comprises members 21 to 24 (anterior side members, a frame, a bezel, or a cover) that cover the front side (anterior side) and the circumferential edge side of the display device 4, a member 25 (lower side member or frame) that covers the lower side (lateral side), and members 26 (corner members or caps) that are positioned at the corners on the lower side. Although not illustrated, the housing 2 further comprises a member (posterior side member, base, bottom, or case) that covers the reverse side (posterior side, rear side, or back side) of the display device 4. In the embodiment, the wall 2k and the walls 2n are comprised in the members 21 to 24, and the wall 2m is comprised in the member that covers the reverse side of the display device 4 as one example. Furthermore, in the embodiment, the member 21 is an example of a first member, the member 22 is an example of a second member, and the members 25 and 26 are examples of a third member.

Figure 6:
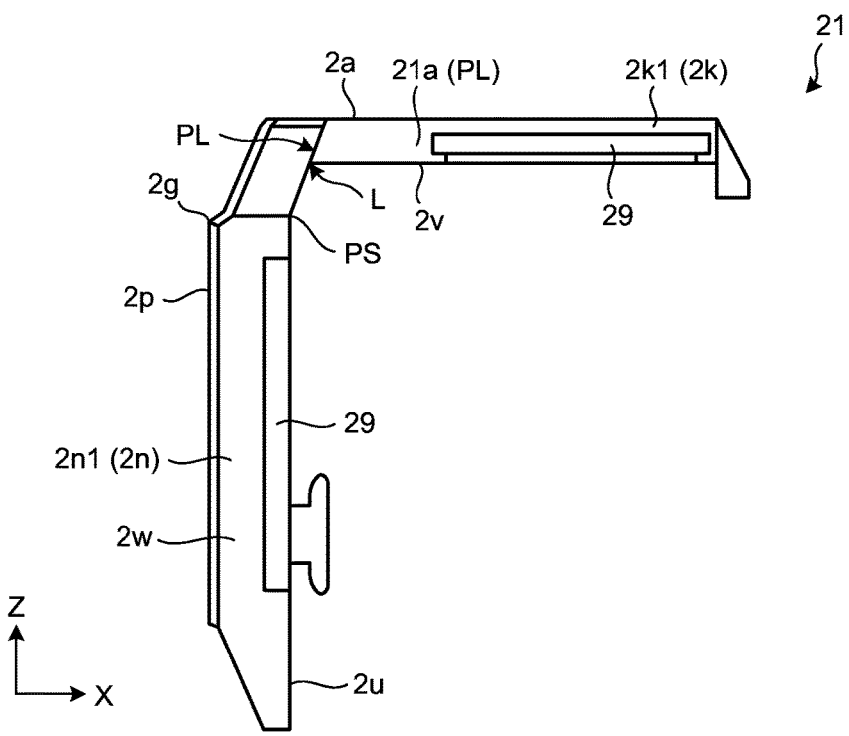
FIG. 6 is an exemplary diagram of the first member of one example of the television receiver when viewed from the direction of the arrow V in FIG. 3, in the embodiment.
Figure 7:
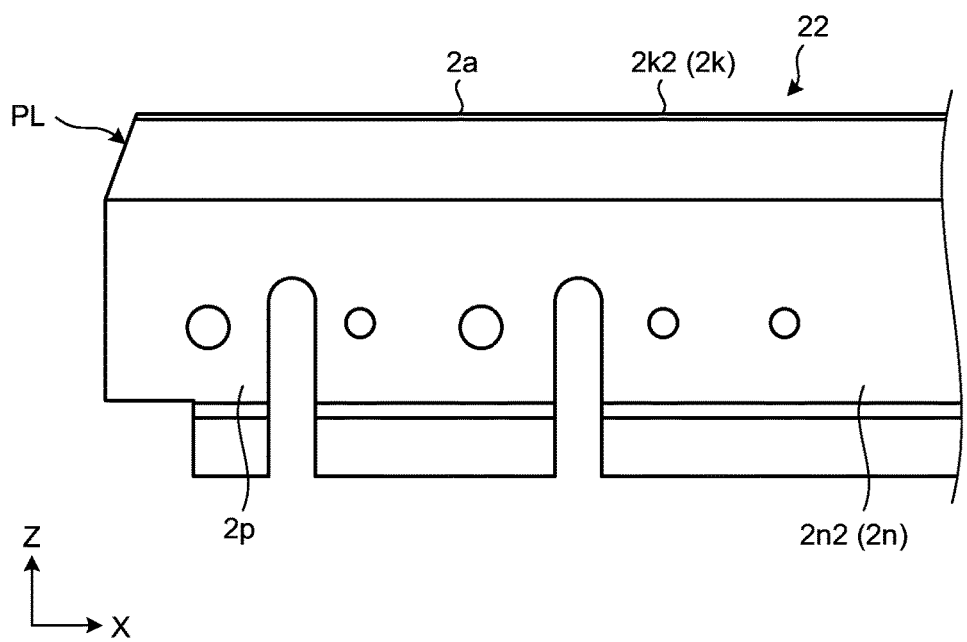
FIG. 7 is an exemplary diagram of the second member of one example of the television receiver when viewed from the direction of the arrow V in FIG. 3, in the embodiment.
Figure 8:
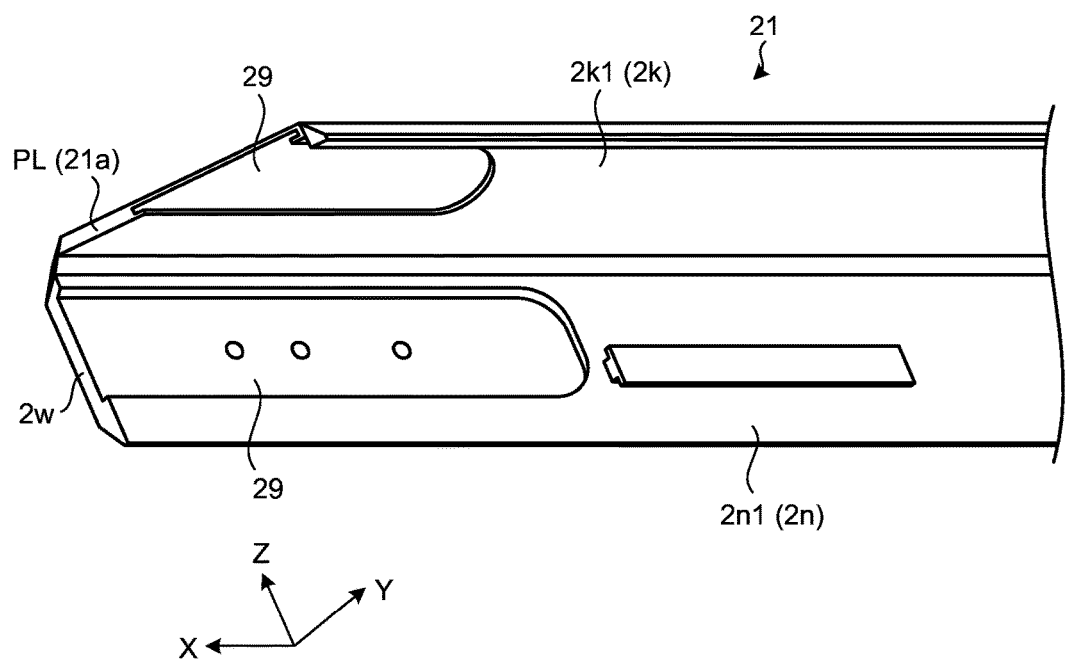
FIG. 8 is an exemplary perspective view of the first member of one example of the television receiver in the embodiment.

A wall 2k1 of the member 21 extends along the end 4c of the display device 4. The wall 2k1 further covers the end 4c from the front side (anterior side) of the face 4a of the display device 4. Furthermore, a wall 2n1 of the member 21 extends from the circumferential edge side of the wall 2k1 towards the back side. The wall 2n1 further covers the end 4c of the display device 4 from the lateral side (from the circumferential edge side). In the embodiment, the wall 2k1 (2k) of the member 21 is an example of a first wall and the wall 2n1 (2n) of the member 21 is an example of a second wall. As illustrated in FIGS. 6 and 8, the member 21 has an L-shaped cross-sectional shape in which the wall 2k1 and the wall 2n1 are orthogonal to each other. On the inner sides of the housing of the wall 2k1 and the wall 2n1, provided are recessed portions 29 into which respective coupling members 27 and 28 are inserted. The member 23 can comprise the same configuration as that of the member 21.

Figure 9:
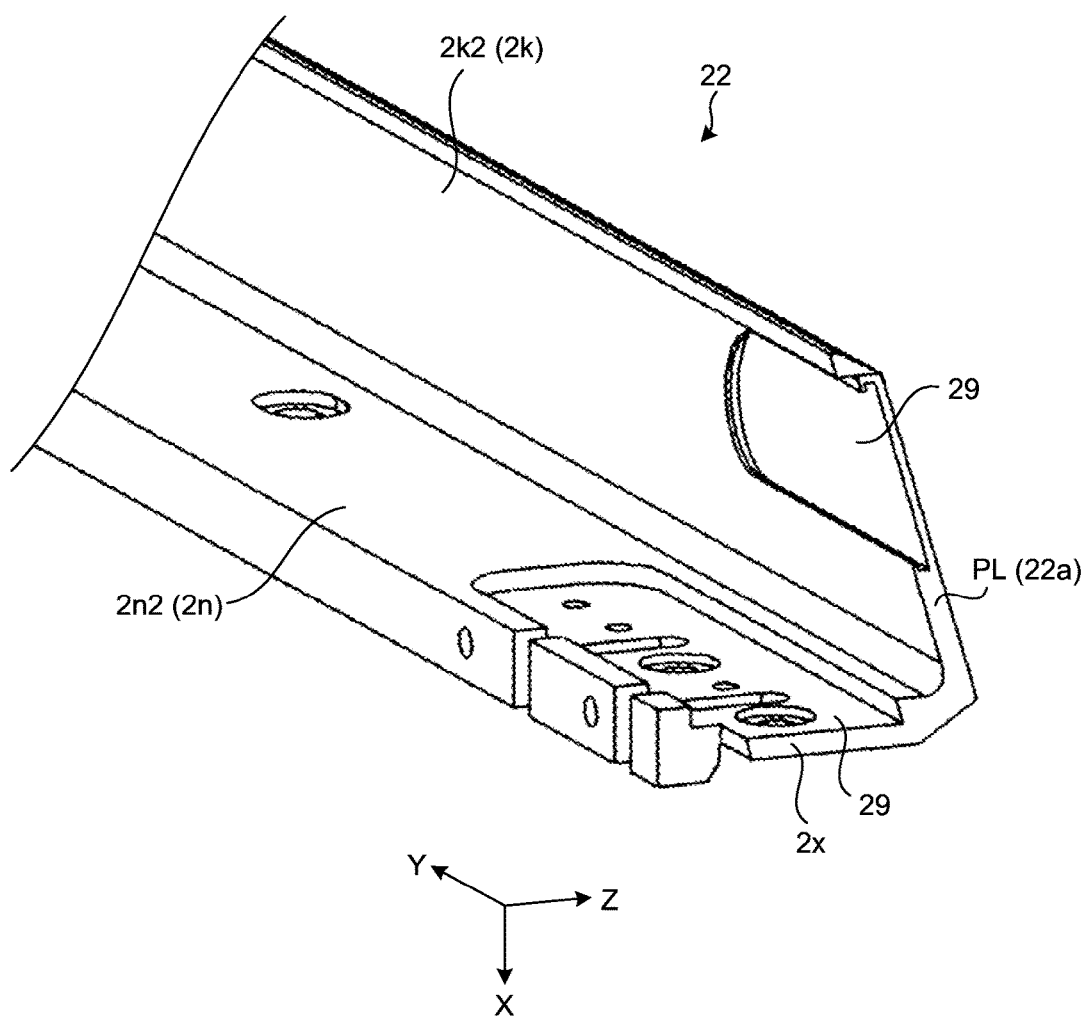
FIG. 9 is an exemplary perspective view of the second member of one example of the television receiver in the embodiment.

A wall 2k2 of the member 22 extends along the end 4d of the display device 4. The wall 2k2 further covers the end 4d from the front side (anterior side) of the face 4a of the display device 4. Furthermore, a wall 2n2 of the member 22 extends from the circumferential edge side of the wall 2k2 towards the back side. The wall 2n2 further covers the end 4d of the display device 4 from the lateral side (from the circumferential edge side). In the embodiment, the wall 2k2 (2k) of the member 22 is an example of a third wall and the wall 2n2 (2n) of the member 22 is an example of a fourth wall. As illustrated in FIG. 9, the member 22 has an L-shaped cross-sectional shape in which the wall 2k2 and the wall 2n2 are orthogonal to each other. On the inner sides of the housing of the wall 2k2 and the wall 2n2, provided also are the recessed portions 29 into which the respective coupling members 27 and 28 are inserted. The member 24 can comprise the same configuration as that of the member 22.

The member 21 and the member 22 abut each other at the corner 2g. An end face 21a (see FIGS. 6 and 8) of the wall 2k1 of the member 21 and an end face 22a (see FIG. 9) of the wall 2k2 of the member 22 configure a parting line PL (parting plane, dividing line, divided face, boundary part, mating face, abutting surface, facing part, see FIGS. 1 to 9). The parting line PL has an external appearance of a straight line in the frontal view of the housing 2 of the television receiver 1, and is configured as a plane (plane along the Z direction) on each of the members 21 and 22.

Figure 3:
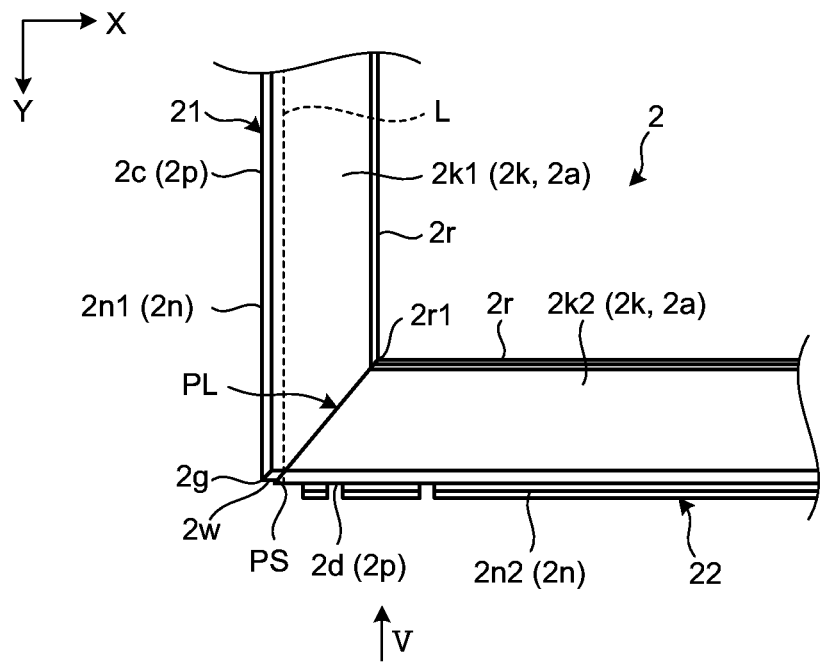
FIG. 3 is an exemplary front view of a first member and a second member of one example of the television receiver at the same position as that of FIG. 2, in the embodiment.

In the embodiment, the parting line PL is provided along an oblique direction intersecting both the X direction and the Y direction in the frontal view (line of sight in FIGS. 1 to 3) as one example. More specifically, as illustrated in FIG. 3, the parting line PL is configured in a straight line extending between the corner 2r1 (second corner) of the opening 2r and a position PS away from the corner of the member 21 or the member 22 (in the embodiment, the corner 2g of the member 21 as one example, or the third corner) in a direction along the X direction or the Y direction (in the embodiment, X direction as one example). That is, in the embodiment, the parting line PL of the wall 2k extends, not between the corner 2r1 on the inner side (the opening 2r side) and the corner 2g on the outer side (circumferential edge side), but between the corner 2r1 on the inner side and the position PS slightly offset from the corner 2g on the outer side as one example. In other words, in accordance with the embodiment, the position PS of the parting line PL on the outer side (circumferential edge side) of the quadrate-frame shaped wall 2k is offset from the corner 2g, as one example. When the parting line PL overlaps (is positioned at) the corner 2g, both the member 21 and the member 22 are to have a sharp edge at the portion facing the parting line PL. A sharp edge in general is likely to be deformed or damaged. In terms of this point, in the embodiment, the parting line PL is offset from the corner 2g, and thus a sharp edge is not formed on either one of the two as one example. Consequently, in accordance with the embodiment, a damage to the member 21 or to the member 22 is not likely to occur at the portion of the parting line PL as one example.

Figure 10:
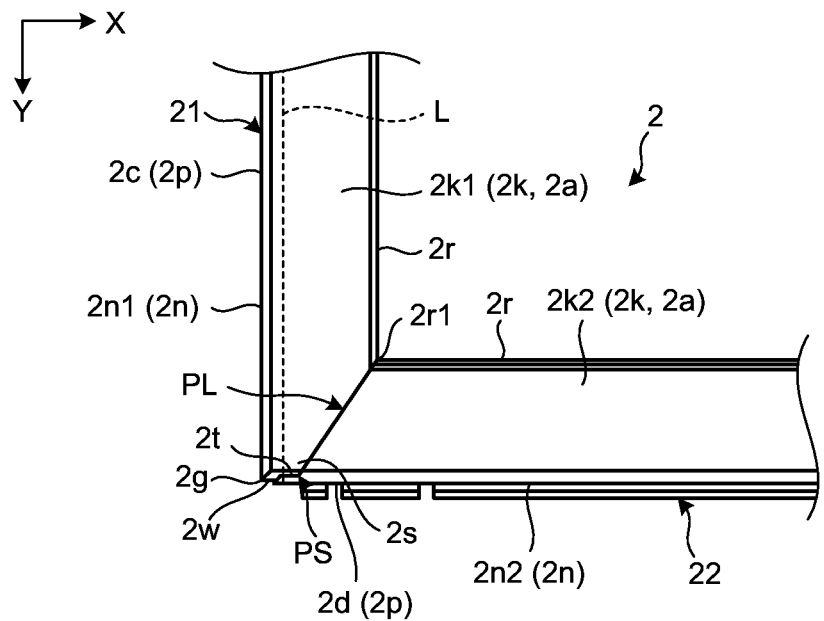
FIG. 10 is an exemplary reference diagram for explaining disadvantages due to the position of a parting line.

Furthermore, in the embodiment, as FIGS. 3 and 6 suggest as one example, the end face 21a of the wall 2k1 is not present between the corner 2g and the position PS. The end face 21a of the wall 2k1 has no area along the X direction, but has an area extending along the direction intersecting the X direction and the Y direction and facing the end face 22a (see FIG. 9) of the wall 2k2. Supposing that when the position PS is on the side to be further away from the corner 2g in the X direction than a boundary line L of a face 2u of the wall 2n1 (end portion, see FIGS. 3, 6, and 10) on the inner side of the housing with the wall 2k1 (a face 2v thereof on the inner side of the housing) as illustrated in FIG. 10 (reference example), a projecting portion 2s (bend portion) is produced on the wall 2k1, and to correspond to this, it necessitates a recessed portion 2t (cutout) to be provided between the wall 2k2 and the wall 2n2. With the configuration in FIG. 10 provided with the recessed portion 2t, labor and cost are likely to be increased for making the recessed portion 2t on the member 22. The projecting portion 2s of the member 21 and the recessed portion 2t of the member 22 which face the parting line PL are not produced when the position PS overlaps the boundary line L or is positioned closer to the corner 2g than the boundary line L (more specifically, when the parting line PL intersects the wall 2n1). In this case, as compared to the configuration in FIG. 10, the labor in manufacturing and the cost thereof are likely to be reduced as one example. As apparent when FIG. 3 and FIG. 10 are compared, the shape of the parting line PL in the frontal view is more likely to be simplified as one example. Consequently, the appearance is more likely to be improved as one example.

Figure 4:
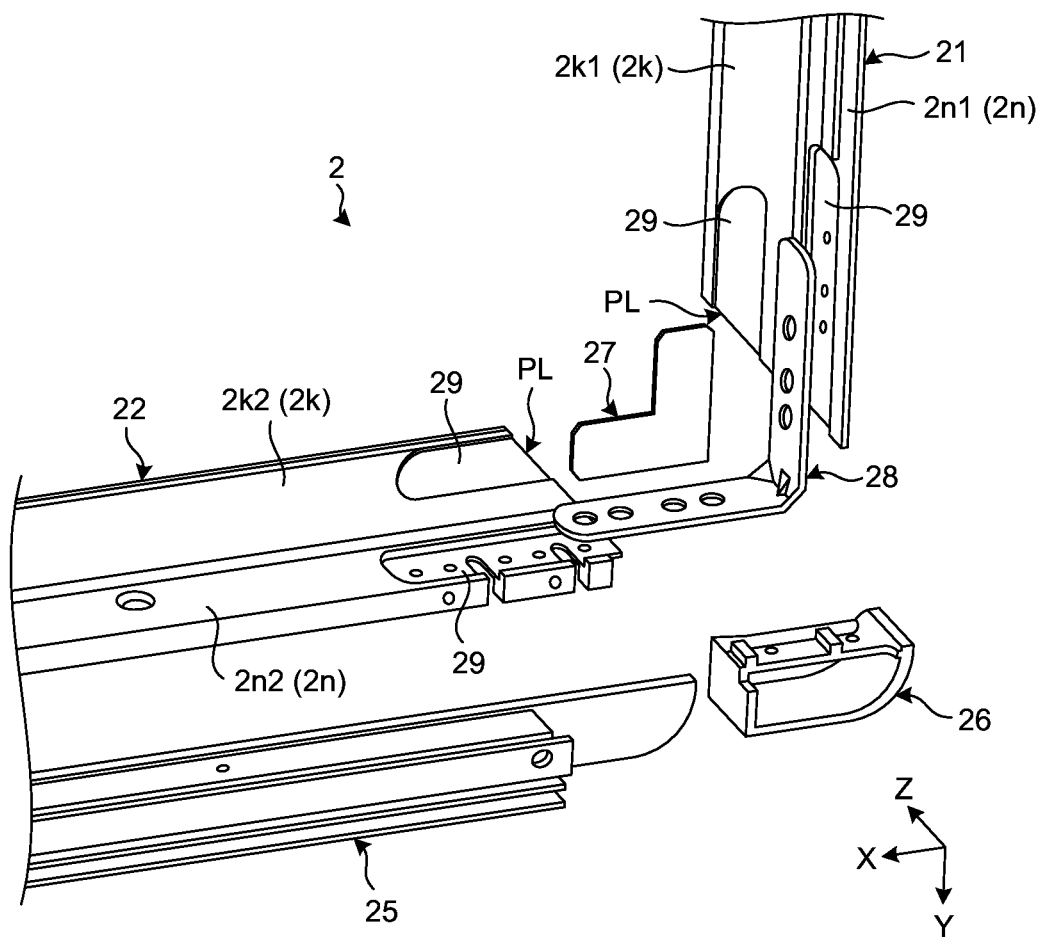
FIG. 4 is an exemplary exploded perspective view of a portion of one example of the television receiver when viewed from the back side of a display screen, in the embodiment.

Moreover, in the embodiment, as illustrated in FIG. 4 as one example, provided are the members 25 and 26 that cover the parting line PL from the wall 2n2 on the side opposite the display device 4. Consequently, in accordance with the embodiment, the parting line PL is covered with (hidden by) the members 25 and 26 on the wall 2n2 side as one example. As a consequence, inconvenient events due to the parting line PL being exposed (for example, a gap is formed and the appearance is likely to be marred) are not caused as one example. Furthermore, the coupling members 27 and 28 have the same surface texture (for example, color and reflectance of light) as that of the face 2a of the walls 2k1 and 2k2 as one example. Even when the inside of the housing is visible from the gap at the parting line PL, the appearance is not likely to be marred. The coupling members 27 and 28 are examples of a member that covers the parting line PL from the inner side of the housing.

Figure 5:
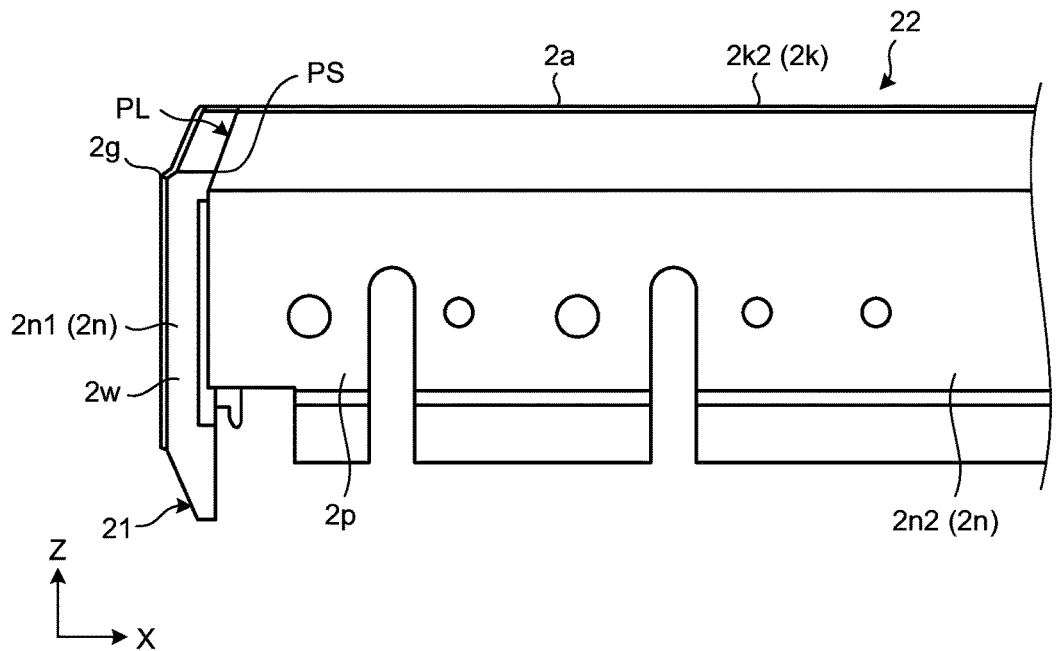
FIG. 5 is an exemplary diagram of the first member and the second member of one example of the television receiver when viewed from the direction of an arrow V in FIG. 3, in the embodiment.

Furthermore, in the embodiment, as illustrated in FIGS. 3, 5, and others as one example, the face 2p of the wall 2n2 on the outer side of the housing projects on the side to be further away from the display device 4 than an end face 2w of the wall 2n1. Consequently, the parting line PL by the wall 2n1 and the wall 2n2 is covered from below by the portion projecting from an end face 2x of the wall 2n2. As a consequence, in accordance with the embodiment, the parting line PL is not likely to be visible from below, and thus, even when a gap is formed due to production tolerance and such of the members 21 and 22, the gap is not likely to be visible as one example. Such construction may be effective when the members 25 and 26 are not provided.

As explained in the foregoing, in the embodiment, the parting line PL of the member 21 (first member) and the member 22 (second member) configuring the housing 2 is configured in a straight line extending in a direction intersecting the X direction and the Y direction between the corner 2r1 (second corner) and the position PS away from the corner 2g (third corner) in the X direction in the frontal view with respect to the face 4a (display screen), as one example. Consequently, in accordance with the embodiment, one of the members 21 and 22 can be configured not to have a sharp edge as one example. Furthermore, in accordance with the embodiment, when it is configured or in a layout that the parting line PL is positioned on one end (in the embodiment, the end portion 2d as one example) side adjacent to the corner 2g and thus the other end (in the embodiment, the end portion 2c as one example) side adjacent to the corner 2g is more likely to be exposed and the one end side is less likely to be exposed, the inconvenient events by the parting line PL are not likely to be caused as one example.

In the embodiment, the end 2d extending along the X direction is configured to be longer than the end 2c extending along the Y direction, and the parting line PL is configured in a straight line between the second corner 2r1 of the opening 2r and the position PS away from the corner 2g in the X direction, as one example. More specifically, the position PS of the parting line PL on the circumferential edge side is away from the corner 2g in the X direction (the long direction of the display device 4 or the second direction) as one example. Moreover, in the embodiment, in a state of the television receiver 1 being placed on the placement surface P, the end 2c is positioned closer to the placement surface P than the end 2e on the side opposite the end 2c, as one example. More specifically, the positions PS are on the placement surface P side in the state of the television receiver 1 being placed on the placement surface P. Consequently, the positions PS are positioned not on the lateral sides of the housing 2 but on the bottom side or on the upside when the television receiver 1 is placed on the placement surface P, and thus the positions PS are not likely to be visible by the user and others.

Figure 11:
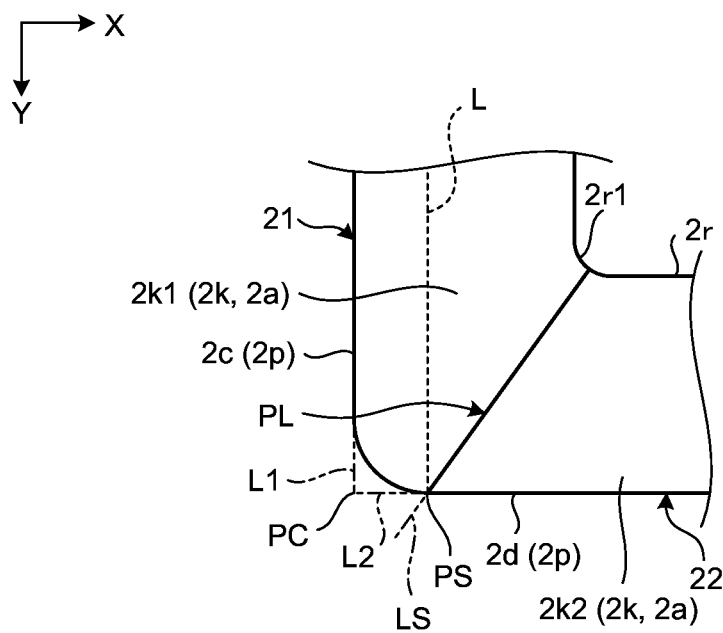
FIG. 11 is an exemplary front view of a portion of a first wall and a second wall of one example of the television receiver in the embodiment.

Furthermore, in a modification illustrated in FIG. 11 as one example, an intersection point PC of a straight line that forms the face 2p (outer face or outer edge) of the wall 2k1 (first wall) or an extended line L1 thereof in the frontal view with respect to the display screen 4a and a straight line that forms the face 2p (outer face or outer edge) of the wall 2k2 (second wall portion) or an extended line L2 thereof in the frontal view is positioned offset from a straight line LS that includes the parting line PL (a boundary part). Even such a configuration can yield the same or similar effects based on the same or similar construction of the above-described embodiment. In this case, the straight line LS can intersect the line or the extended line L2 between the intersection point PC and the boundary line L as one example. Moreover, the end portion of the parting line PL on the opening 2r side can be positioned at a curved portion provided at the corner 2r1 (rounded portion) on the opening 2r side as one example. The position of the parting line PL and the shapes of the members 21 and 22 can be implemented with appropriate changes.

While the certain embodiment of the present invention has been explained in the foregoing, the embodiment has been presented by way of example only. The invention is not restricted to the above-described embodiment, and thus a variety of modifications can be made. The technical features of the embodiment and modification can be embodied in appropriate combination. Furthermore, the specification (such as the structure, type, direction, shape, size, length, width, thickness, height, number of pieces, arrangement, position, and material) of each constituent element can be implemented with appropriate changes. The present invention can be constructed as a video display device other than the television receiver, for example, a monitor. While the structure of the boundary portion of the member 21 and the member 22 has been described in the embodiment, the structure in the embodiment can be applied to the boundary portion of the member 22 and the member 23, to the boundary portion of the member 21 and the member 24, and to the boundary portion of the member 23 and the member 24 in the same manner. When there is a gap between end edges (end faces) of the two members at the boundary portion, the two end edges (end faces) correspond to the boundary portion. More specifically, the two end edges (end faces) only need to satisfy the condition of the above-described boundary portion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video display device comprising:
   a display device comprising a display screen, a first end, a first corner, and a second end, wherein
      the first end is positioned on a circumferential edge side of the display screen and extending along a first direction when the display screen is viewed from the front thereof,
      the first corner is adjacent to the first end and positioned on the circumferential edge side of the display screen,
      the second end is adjacent to the first corner, longer than the first end, positioned on the circumferential edge side of the display screen, and extending along a second direction intersecting the first direction when the display screen is viewed from the front thereof, and
      the display device is in a quadrangular shape when the display screen is viewed from the front thereof; and
   a housing comprising a first member, a second member, and an opening, wherein
      the first member extending along the first end comprises:
         a first wall covering the first end from a front side of the display screen along the first end and
         a second wall extending from a circumferential edge side of the first wall towards a back side of the display screen and covering the first end,
      the second member extending along the second end and abutting on the first member comprises:
         a third wall covering the second end from the front side of the display screen along the second end and
         a fourth wall extending from a circumferential edge side of the third wall towards the back side of the display screen and covering the second end, and
      the display screen is exposed through the opening, wherein
      when viewed from the front of the display screen, a boundary of the first member and the second member inclines with respect to the first direction and the second direction, and extends straight between a second corner of the opening and a position offset from a third corner in the second direction, the third corner being a corner of a circumferential edge of the first member or the second member.

2. The video display device according to claim 1, wherein the second end is positioned closer to a placement surface than an end opposite the second end in a state when the television receiver is placed on the placement surface.

3. The video display device according to claim 1, wherein, when the display screen is viewed from the front thereof, the position away from the third corner in the direction along the first direction or the second direction is configured to overlap a boundary line of a surface of the second wall on an inner side of the housing with the first wall or to be positioned close to the third corner than the boundary line.

4. The video display device according to claim 1, further comprising a third member configured to cover the part from the fourth wall on a side opposite the display device.

5. The video display device according to claim 1, wherein a face of the fourth wall on an outer side of the housing is configured to project from an end face of the second wall toward a side away from the display device.

6. A video display device comprising:
a display device comprising a display screen;
a first wall covering a circumferential edge of the display device on the display screen side and extending in a first direction; and
a second wall longer than the first wall covering the circumferential edge of the display device on the display screen side, abutting on the first wall at a boundary part of the first wall and the second wall, and extending along a second direction intersecting the first direction, wherein
when viewed from the front of the display screen,
the boundary part inclines with respect to the first direction and the second direction, and
an intersection between a straight line or a first extended line thereof and a straight line or a second extended line thereof is positioned offset from the boundary part in the second direction, the first straight line forming an outer edge of the first wall, the second straight line forming an outer edge of the second wall.

7. A television receiver comprising:
a display device comprising a display screen, a first end, a first corner, and a second end, wherein
the first end is positioned on a circumferential edge side of the display screen and extending along a first direction when the display screen is viewed from the front thereof,
the first corner is adjacent to the first end and positioned on the circumferential edge side of the display screen, and
the second end is adjacent to the first corner, longer than the first end, positioned on the circumferential edge side of the display screen, and extending along a second direction intersecting the first direction when the display screen is viewed from the front thereof,
wherein the display device is in a quadrangular shape when the display screen is viewed from the front thereof; and
a housing comprising a first member, a second member, and an opening, wherein
the first member extending along the first end comprises:
a first wall covering the first end from a front side of the display screen along the first end and
a second wall extending from a circumferential edge side of the first wall towards a back side of the display screen and covering the first end,
the second member extending along the second end and abutting on the first member comprises:
a third wall covering the second end from the front side of the display screen along the second end and
a fourth wall extending from a circumferential edge side of the third wall towards the back side of the display screen and covering the second end, and
the display screen is exposed through the opening, wherein
when viewed from the front of the display screen, a boundary of the first member and the second member inclines with respect to the first direction and the second direction, and extends straight between a second corner of the opening and a position offset from a third corner in the second direction, the third corner being a corner of a circumferential edge of the first member or the second member.

* * * * *